United States Patent [19]

Seibert

[11] 4,309,450

[45] Jan. 5, 1982

[54] METHOD FOR MANUFACTURING A SEAFOOD PRODUCT

[76] Inventor: Robert W. Seibert, Rte. 1, Box 57, Oxford, Md. 21654

[21] Appl. No.: 188,899

[22] Filed: Sep. 19, 1980

[51] Int. Cl.³ .............................................. A23P 1/00
[52] U.S. Cl. ..................................... 426/92; 426/284; 426/289; 426/296; 426/302; 426/513; 426/516
[58] Field of Search ................... 426/89, 92, 100, 643, 426/646, 293, 274, 284, 516, 517, 512, 513, 524, 249, 462, 289, 296, 302; 425/462, 463, 131.1

[56] References Cited

U.S. PATENT DOCUMENTS

| | | | |
|---|---|---|---|
| 2,724,651 | 11/1955 | Hampton et al. | 99/195 |
| 3,017,273 | 1/1962 | Marvin et al. | 99/7 |
| 3,241,503 | 3/1966 | Schafer | 425/462 |
| 3,712,821 | 1/1973 | Ronsivalli et al. | 99/111 |
| 3,793,466 | 2/1974 | Hawkins et al. | 426/274 |
| 3,897,573 | 7/1975 | Kelly | 426/272 |
| 4,200,959 | 5/1980 | Cheney | 426/513 |

FOREIGN PATENT DOCUMENTS 341760  1/1931  United Kingdom ............... 426/284

Primary Examiner—Joseph M. Golian
Assistant Examiner—George C. Yeung

[57] ABSTRACT

Prefried, frozen food products, primarily seafood products are made in the form of a composite extrudate including a central core and an outer layer surrounding the core. The central core consists predominantly of coarsely ground seafood, such as clam meat, and the outer layer comprises the same seafood more finely ground and mixed with a binder. The extruded products suitably cut to length may be battered and breaded prior to prefrying and freezing.

6 Claims, 2 Drawing Figures

METHOD FOR MANUFACTURING A SEAFOOD PRODUCT

BACKGROUND OF THE INVENTION

This invention relates to food products, more particularly to prefried, frozen seafood products and the like, with particular reference to frozen clam and shrimp products.

Prefried, frozen seafood products, such as shrimp and clam products, are becoming increasingly popular. In the case of prefried clam strips in particular, these are usually produced only from the foot or tongue of the clam (generally the surf clam) which is sliced into strip form, battered and breaded, prefried and then frozen. The body meat or salvage is generally not usable in such products. Due inter alia to catch limitations placed on the surf clam, there is a limited supply of tongues available for use in making prefried, frozen strips and the finished product tends therefore to be a restaurant "menu item" rather than a promotional "all you can eat" special.

It is a particular object of the invention to provide a novel form of prefried, frozen clam product and a method of making same, whereby clam strips can be made using a greater percentage of the meat available from the clam as a whole.

Another object of the invention is to provide a prefried, frozen clam product using comminuted (e.g., ground or chopped) clam meat.

A further object of the invention is to provide a prefried, frozen clam product and method of making same from comminuted clam meat, which product simulates in its eating characteristics the heretofore described sliced clam strips.

Still another object of the invention is to provide novel food products, particularly seafood and vegetable products, and methods of making same from comminuted primary ingredients.

Yet another object of the invention is to provide a novel prefried, frozen food product and method of manufacturing same from a comminuted primary ingredient of animal or vegetable matter, whereby the finished product simulates in eating characteristics a similar product made from the same primary ingredient in strip form.

SUMMARY OF THE INVENTION

The invention provides, at least in one of its broader aspects, a prefried, frozen food product in the form of a composite structure having a central core and an outer layer surrounding the core, the core being formed of a first mixture consisting essentially of a primary ingredient of animal or vegetable matter in comminuted form and the outer layer being formed from a second mixture including the same primary ingredient as the core in comminuted form, and a binder, the mixtures having different characteristics respectively.

In a preferred form of the invention, for example, the percentage by weight of primary ingredient in the core may be greater than in the outer layer, and the primary ingredient may be more finely comminuted in the outer layer than in the core.

In the case of a frozen clam product, for example, the core may be formed from a mixture consisting predominantly of coarse ground clam meat, preferably surf clam but which may also comprise quahog, and a small percentage of a stabilizing additive or binder such as spun soya or soy protein. The clam meat may come from the clam foot, or tongue and/or the body. The mixture may, for example, contain about 95% clam meat by weight and about 5% additive. The clam meat may be ground or chopped to a particle size having a major dimension of about ⅜ inch. The other layer may be formed from a mixture comprising more finely ground clam meat (surf clam and/or quahog) and binder such as soy protein. The percentages by weight in the outer layer may be of the order of 75-80% clam meat and 20-25% binder and the clam meat may be ground or chopped to a particle size having a major dimension of the order of ⅛ inch.

Products as defined above may be manufactured in accordance with a further aspect of the invention, by providing the respective core and outer layer mixtures in slurry form and extruding the mixtures through a composite extruder head having a central extrusion orifice for the core, surrounded by an annular extrusion orifice for the outer layer. On passage from the extruder head, the product may be cut to approximately bite-size (1½-4") random lengths, battered and breaded, then prefried, frozen in conventional manner and packaged.

Apart from clam products, the invention may be used in the manufacture of other prefried, frozen seafood products, particularly shrimp products and vegetable products such as onion strips, by suitable substitution of the primary ingredient.

Products in accordance with the invention simulate prefried, frozen products made from sliced strip and, particularly in the case of clams and the like, the inventive products can utilize a greater percentage of the meat available from the clam, and the finished product can therefore be made available more economically than the sliced strip products.

DESCRIPTION OF THE PREFERRED EMBODIMENT

Figure 1:
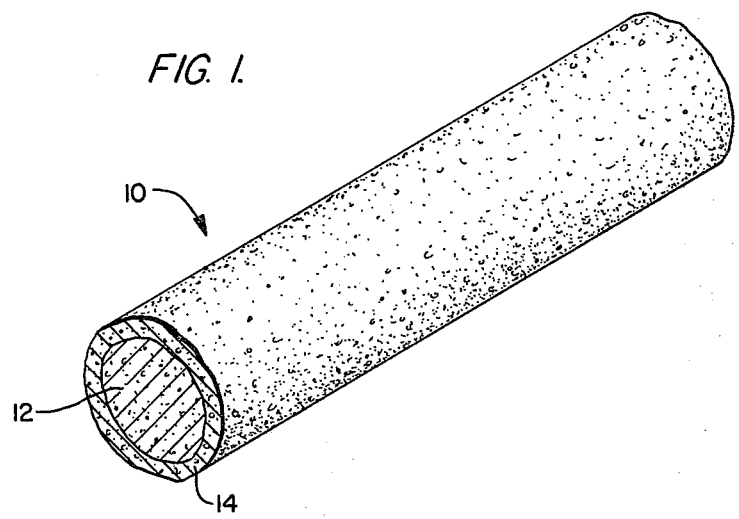
FIG. 1 is a perspective view of an extruded food product in accordance with the invention.

FIG. 1 shows a prefried, frozen food product in the form of a composite extrudate 10 comprising an inner core 12 and an outer layer 14 surrounding core 12. Core 12 comprises a mixture consisting predominantly of a coarsely ground or chopped primary ingredient of animal or vegetable matter and a small amount of stabilizeer or binder. Generally, there may be just sufficient binder in the core to hold the primary ingredient firm. The primary ingredient may, for example, comprise clam meat (surf clam and/or quahog) chopped or ground into particles having a major dimension of about ⅜ inch. The binder may be spun soya or soy protein and the proportions of these ingredients may, for example, be of the order of 95% by weight clam meat to 5% by weight binder.

Outer layer 14 may comprise a mixture of the same primary ingredient as the core, but more finely ground or chopped, and a binder. The percentage weight of primary ingredient in outer layer 14 is less than in the core. In the case of a clam product, outer layer 14 may contain about 75-80% ground or chopped surf clam and/or quahog and about 20-25% binder such as soy protein. The clam meat may in this case be ground or chopped to a particle size having a major dimension of about ⅛ inch.

Alternative binders for use in the product may, for example, include mixtures of finely ground clam meat, juice and breading, and additives such as sodium chloride and tripolyphosphate may be included.

The illustrated product is preferably enrobed in a conventional frying batter and the outer surface is preferably breaded. Typical dimensions for the product are:

Diameter of core: ±¼ inch

Outer diameter of product: ±7/16 inch

Length: 1½–4 inches

Figure 2:
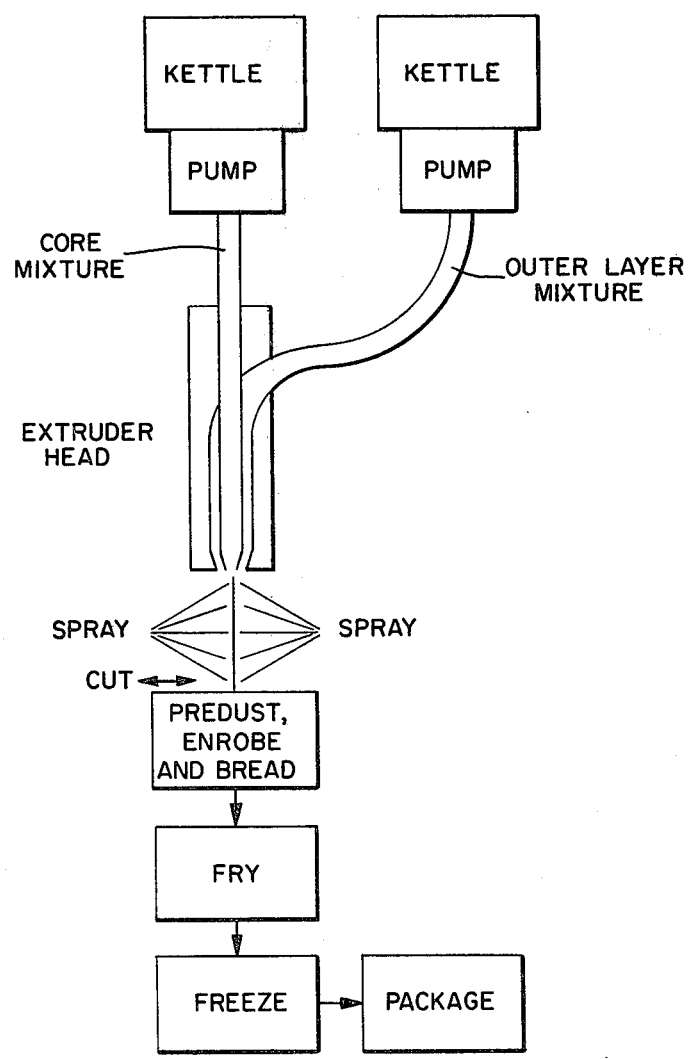
FIG. 2 is a diagrammatic view illustrating the process used in manufacturing the product shown in FIG. 1.

A method in accordance with the invention for manufacturing products as described above is diagrammatically illustrated in FIG. 2.

Initially, slurries of the respective core and outer layer mixtures are formed and placed in respective storage containers or kettles. In the case of the core mixture for a clam product, a suitable slurry may, for example, be formed by mixing about 95 pounds of the coarsely ground or chopped clam meat with about 5 pounds of soy protein or like stabilizer or binder and about 5 pounds of water or clam juice. A suitable slurry for the outer layer may, for example, be formed by mixing about 75 to 80 pounds of the finely ground or chopped clam meat with about 20 to 25 pounds of soy protein or like binder and about 10 to 12 pounds of water or clam juice.

From the storage kettles, the respective slurries are pumped in a chilled state to a composite extruder head having a central extrusion orifice through which the core is extruded and a surrounding annular extrusion orifice through which the outer layer is extruded. Composite extruder heads of this type are well known and need not be described in detail. The pumps may, for example, be positive displacement food pumps (e.g., Moyno pumps), the pressure through the extruder being determined inter alia by the speed of the pumps. Typically, for a ¼ inch diameter inner extrusion orifice and a ⅜ inch diameter outer extrusion orifice, the extrusion pressure can be set in the range 5 to 15 pounds per square inch.

On passage from the extruder head, the composite extrudate may optionally be sprayed with a stiffening agent such as calcium chloride, for example, if a stiffer outer coating is required. The extrudate may then be cut to random bite-size lengths, for example in the range 1½ to 4 inches.

After cutting, the extruded products may be enrobed with batter and breaded in a continuous flow, then instant quick fried in soy or other suitable frying oil at about 345°–375° F. for 5–12 seconds, frozen, for example, by nitrogen, carbon dioxide or in a mechanical freezer and suitably packaged. The products may, for example, be enrobed with batter and breaded on a conveyor, and moved by conveyor through a suitable fryer and freezer.

As an alternative to the breading step described above, breading can be included in the outer layer mixture. Further, while process has been specifically described in relation to clam products, it will be understood that the process can be used for other products in the manufacture, for example, of extruded shrimp or onion sticks, by suitable substitution of the primary ingredient.

The frozen products of the invention may be prepared for the table in conventional manner, for example, by further frying. In the finally prepared product, the outer layer serves to hold the comminuted primary ingredient in the core together and the consistency of the product is found to simulate that of a product made from a sliced strip of the same basic ingredient.

While only preferred embodiments of the invention have been described herein in detail, it will be understood that the invention is not limited thereby, and modifications may be made within the scope of the attached claims.

I claim:

1. A method of manufacturing a seafood product, the method comprising the steps of providing a first extrudable mixture consisting predominantly of a seafood selected from the group consisting of clam and shrimp in comminuted form having a particle size of about ⅜ inch and a binder, providing a second extrudable mixture consisting predominantly of the same comminuted seafood having a particle size of about ⅛ inch and a binder, extruding the mixtures simultaneously through a composite extruder head having a central extrusion orifice through which the first mixture is extruded and an annular extrusion orifice surrounding the central orifice and through which the second mixture is extruded, whereby a composite extrudate issues from the extruder head comprising a central core having a diameter of about ¼ inch formed from the first mixture and an outer layer having an outer diameter of about 7/16 inch surrounding the core formed from the second mixture.

2. A method as defined in claim 1 including the further steps of cutting the extrudate into individual lengths and prefrying and freezing the individual lengths.

3. A method as defined in claim 2 including the additional step of enrobing the individual lengths in batter prior to the prefrying step.

4. A method as defined in claim 3 including the additional step of breading the enrobed individual lengths prior to the prefrying step.

5. A method as defined in claim 1 wherein the core comprises about 95% by weight of the seafood with about 5% by weight of binder and the outer layer comprises about 75–80% by weight of the seafood with about 20–25% by weight of binder.

6. The product produced by the method of claim 1.

* * * * *